United States Patent [19]
Hofer

[11] Patent Number: 6,117,006
[45] Date of Patent: Sep. 12, 2000

[54] REMOTE ADJUSTMENT OF A SIEVE OF A COMBINE HARVESTER

[75] Inventor: John Hofer, Darlingford, Canada

[73] Assignee: Pembina Colony Ltd., Darlingford, Canada

[21] Appl. No.: 08/924,947

[22] Filed: Sep. 8, 1997

[51] Int. Cl.[7] .............................. A01F 12/32; A01F 12/44
[52] U.S. Cl. ........................................... 460/101; 460/109
[58] Field of Search ..................................... 460/101, 102, 460/85, 93, 94, 95, 96, 109, 146, 119

[56] References Cited

U.S. PATENT DOCUMENTS

| | | | |
|---|---|---|---|
| 3,949,761 | 4/1976 | Mortier et al. ............................ | 460/109 |
| 4,425,925 | 1/1984 | Kersting et al. ..................... | 460/101 X |
| 4,897,072 | 1/1990 | Bestland . | |
| 5,795,223 | 8/1998 | Spiesberger et al. .................... | 460/102 |

FOREIGN PATENT DOCUMENTS 40-6276842  10/1994  Japan ...................................... 460/101

*Primary Examiner*—Terry Lee Melius
*Attorney, Agent, or Firm*—Adrian D. Battison; Murray E. Thrift

[57] ABSTRACT

Adjustment of the sieve of a combine harvester is effected by an adjustment apparatus attached to the side wall of the combine on the outside surface. The adjustment apparatus comprises an angle bracket having a vertical portion screwed to the side wall and a generally horizontal plate. The lever is pivotally mounted to pivot in a plane parallel to the horizontal plate and is maintained in place by a top strap having an arcuate series of holes for pinning the lever at a selected position. A rod extends from the end of the lever through a slot in the side wall of the combine to an adjustment arm extending rearwardly from the sieve. The adjustment position of the arm can therefore be locked in place and is visible from the outside of the combine.

18 Claims, 5 Drawing Sheets

REMOTE ADJUSTMENT OF A SIEVE OF A COMBINE HARVESTER

This invention relates to an apparatus for remote adjustment of the sieve of a combine harvester.

BACKGROUND OF THE INVENTION

Combine harvesters generally include a sieve in the form of a generally horizontal apertured plate which allows the grain to pass through the apertures while the lighter chaff is discharged rearwardly from the sieve. In order to assist the rearward movement of the chaff, the sieve is reciprocated back and forth in the longitudinal direction of the combine harvester.

The sieve apertures are adjusted by one or more rearwardly projecting arms at the rear end of the sieve and these are moved manually by the operator standing at the rear of the sieve, the arms moving transversely of the sieve in a generally horizontal plane.

It has been a long standing problem that the adjustment of the sieve is difficult due to the fact the arms are located on the sieve thus requiring the operator to move to the position at the arms and to stand at the position generally while the combine harvester is operating so that there is dust and debris in the area of the adjustment while the adjustment is effected.

In addition there is a tendency for the adjustment to slip so the adjustment is not properly maintained.

These difficulties have lead to a situation where for many years the adjustment of the sieve has been generally ineffective leading to loss of grain. In the preferred condition, the sieve is adjusted on a regular bases depending upon the conditions which can very during a working shift.

One example of a device for adjusting the sieve is shown in U.S. Pat. No. 4,897,072 of Bestland issued Jan. 30th 1990 in which a relatively complex linkage extends from the arms of the sieve to an adjustment member located in the cab. This device has been available in the market place for some years but has not achieved significant success in that many combine harvesters still operate without such a device. The complexity and expense has to some extent detracted from the use of this device. A motorized adjustment arrangement is also available which includes a motor mounted on the side wall which drives a rod longitudinally to effect the adjustment movement. This device is again relatively expensive and has not been widely adopted. In addition there is no visual indication as to the position of the adjustment.

SUMMARY OF THE INVENTION

It is one object of the present invention to provide an improved adjustment device for the sieve of a combine harvester which is inexpensive, provides easy adjustment and also provides a ready visual indication of the position of the adjustment.

According to the invention, therefore, there is provided a combine harvester comprising;
- a harvester body having two side walls parallel to a longitudinal direction of the harvester body;
- generally horizontal, apertured sieve plate mounted within the body between the side walls for reciprocating movement in a direction longitudinal of the harvester body for separating grain from chaff;
- a manually operable adjustment arm mounted on the sieve plate and projecting rearwardly therefrom for adjustment of apertures of the sieve plate;
- and a remote adjustment apparatus for actuating adjustment of the arm comprising;
  - a bracket mounted on an outside surface of one side wall of the body, the bracket having an adjustment plate member arranged substantially at right angles to the side wall;
  - an adjustment lever mounted on the adjustment plate member parallel to the plate member for pivotal movement relative there to in a plane parallel thereto about a pivot pin at right angles to the plate member;
  - an adjustment rod having one end pivotally connected to one end of the lever and an opposed end pivotally connected to the arm;
  - a slot-shaped opening in the side wall adjacent the bracket;
  - the rod passing through the slot shaped opening from the lever to the arm such that the rod accommodates said reciprocating movement of the sieve and the arm while the lever remains stationary and such that said pivotal movement of the lever causes pivotal movement of the arm;
  - and a plurality of locating apertures on the plate member and arranged such that the lever can be locked at a selected one of a plurality of spaced positions angularly of the pivot pin relative to the plate member to locate the arm of the sieve in a predetermined adjustment position.

Preferably the plate member is horizontal.

Preferably the lever has a handle portion at an end thereof opposite the rod.

Preferably the handle portion is cranked relative to a main body of the lever in a direction away from the side wall.

Preferably the bracket includes a vertical plate bolted to the side wall.

Preferably the plate member includes a top strap member parallel to the plate member and defining therewith a slot in which the lever is movable, the locating apertures being provided in the strap member and/or the plate member.

Preferably the apertures are in the strap member.

Preferably the bracket is mounted directly on the side wall.

Preferably the bracket is mounted on a vertical beam forming a frame for the side wall.

Preferably the sieve includes a second arm parallel to the first arm and wherein there is provided an additional rod member interconnecting the arms and wherein the opposed end of the adjustment rod is attached to the additional rod member.

Preferably the locating apertures are arranged in an arc around the pivot pin and wherein the rod is connected to the lever at a distance from the pivot pin substantially equal to the distance of the locating apertures from the pivot pin.

According to a second aspect of the invention there is provided a combine harvester comprising;
- a harvester body having two side walls parallel to a longitudinal direction of the harvester body;
- generally horizontal, apertured sieve plate mounted within the body between the side walls for reciprocating movement in a direction longitudinal of the harvester body for separating grain from chaff;
- two manually operable adjustment arms mounted on the sieve plate and projecting rearwardly therefrom for adjustment of apertures of the sieve plate;
- and a remote adjustment apparatus for actuating adjustment of the arms comprising;
  - a bracket mounted on an outside surface of one side wall of the body, the bracket having an adjustment plate member arranged substantially at right angles to the side wall;

an adjustment lever mounted on the adjustment plate member parallel to the plate member for pivotal movement relative thereto in a plane parallel thereto about a pivot pin at right angles to the plate member;

an adjustment rod having one end pivotally connected to one end of the lever and an opposed end pivotally connected to the arm;

a slot-shaped opening in the side wall adjacent the bracket;

the rod passing through the slot shaped opening from the lever to the arms such that the rod accommodates said reciprocating movement of the sieve and the arms while the lever remains stationary and such that said pivotal movement of the lever causes pivotal movement of the arms;

an additional rod member interconnecting the arms with the opposed end of the adjustment rod attached to the additional rod member and a plurality of locating apertures on the plate member and arranged such that the lever can be locked at a selected one of a plurality of spaced positions angularly of the pivot pin relative to the plate member to locate the arm of the sieve in a predetermined adjustment position.

DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
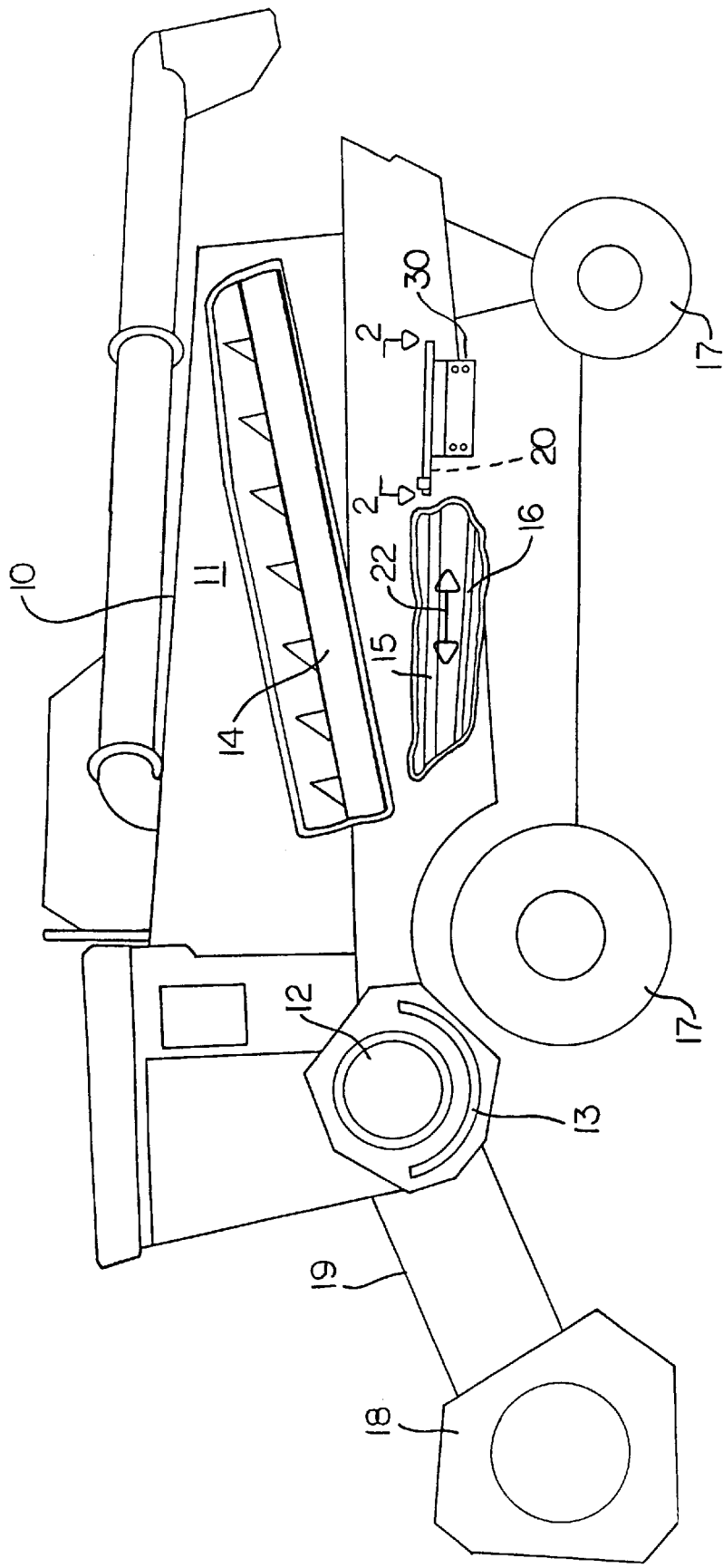
FIG. 1 is a schematic side elevational view of a combine harvester according to the present invention.

A conventional combine harvester is illustrated schematically in FIG. 1 and comprises a housing 10 having side walls 11 housing the working elements of the combine including a cylinder 12, a concave 13, straw walkers 14, a sieve 15 and a chaffer 16. The housing is mounted on ground wheels 17 for movement across the ground so that a header 18 picks up a crop and feeds the crop to the cylinder 12 through a feeder house 19.

Figure 2:
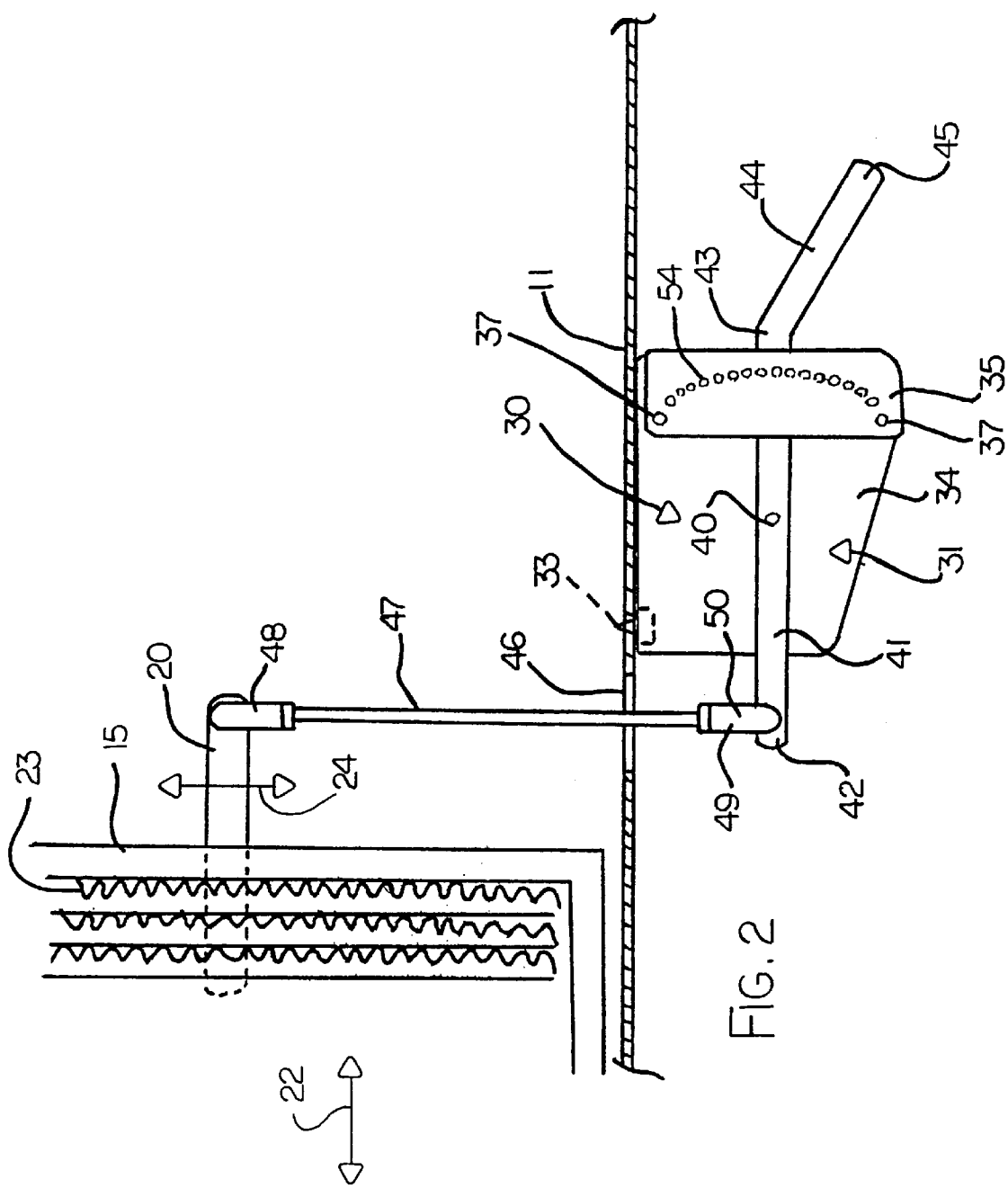
FIG. 2 is a cross sectional view along the lines 2—2 of the FIG. 1 on an enlarged scale.

Turning now to FIG. 2, the construction of the sieve 15 is shown in more detail and is comprising a plate member which is generally horizontal and is moved by an actuation system 21 in a forward and rearward reciprocating action 22 to assist in moving chaff rearwardly while grain falls though the sieve for collection. The sieve thus includes a generally horizontal plate member having apertures 23 which are adjusted by side to side movement 24 of an arm 20 which extends rearwardly from a rear end of the sieve. Normally the arm 20 is adjusted manually and is available to an operator standing behind the sieve.

In accordance to the present invention there is provided an adjustment apparatus 30 for effecting controlled adjustment of the arm 20. The apparatus 30 comprises a bracket 31 mounted on one side wall 11 of the housing. The bracket includes a vertical plate 32 which is fastened to the side wall 11 by screws 33. The bracket further includes a horizontal chop plate 34 which thus stands outwardly to the vertical side wall 11 of the housing. On top of the horizontal plate 34 is formed atop strap 35 which extends parallel to the top plate and is spaced from the top plate so as to define a slot 36 between the plate 34 and the top strap 35. The top strap is supported on the plate by vertical bolts 37 including spacers 38 which hold the top strap in spaced position defining a slot 36. A pivot pin 40 stands vertically upwardly from the plate 34 and carries a horizontal lever 41 for pivotally movement in a plane parallel to the plate 34. The lever 41 includes a main straight body portion extending from a forward end 42 to a rear end 43 projecting just rearwardly of the top strap 35. Thus the main body portion of the lever extends across the top of the plate and through the slot 36 to the rear end 43. At the rear end is attached a handle portion 44 which is cranked at an angle to the main body portion while remaining in the same plane as the body portion so as to extend outwardly away from the side wall 11 to an outer most end 45 spaced by distance from the side wall greater than that of the end 43.

A slot shaped opening 46 is formed in the side wall 11. An actuating rod 47 extends from an the end 42 of the lever 41 through the opening 46 and connects the lever 41 to the arm 20. The rod 47 has an inner end 48 and an outer end 49 with the inner end connected to the arm 20 and the outer end connected to the lever 41. Each of the ends 48 and 49 carries a pivot coupling 50 in the form of a cap 51 and a pin 52 with the latter connected to receptive on of the lever and the arm standing upwardly therefrom. The rod 47 thus pivots at each end to accommodate the reciprocating movement 22 of the sieve. The portion of the rod extending from the side wall 11 to the arm 20 is very much longer than the portion extending from the side wall 11 to the lever 41 and therefore the majority of the movement of the rod is accommodated within the housing that is inside of the side wall 11 and thus the slot 46 is relatively short and is shorter than the reciprocating movement 22.

The arm 20 and thus the apertures in the sieve can be adjusted by manual movement of the lever 41. When adjusted the lever is locked in place by a pin 52 which projects through a hole 53 in the arm 41 and through a selected one of a priority of holes 54 in the top strap 35. The holes 54 are arranged in an ark surrounding the pivot pin 40 and are arranged approximately equidistant for the pin 40 relative to the pivot coupling 50.

In operation, therefore, the operator can manually adjust the sieve while standing outside the side wall 11. When adjustment is complete, the pin 52 carrying a looped handle 55 is inserted through the overlying holes in the top strap 35, through the hole 53 in the lever and optionally through holes in the plate 34. The pin is locked in place so as to hold the lever fixed at that selected position thus holding the arm 20 at the selected adjustment position.

As the adjustment device is mounted on the outside of the side wall 11, it is readily visible so that the operator can readily check the adjusted position without the necessity of recalling exactly the position selected. If a change in the adjustment is necessary, the operator can readily actuate the adjustment by operating a lever and replacing the pin 52.

Figure 4:
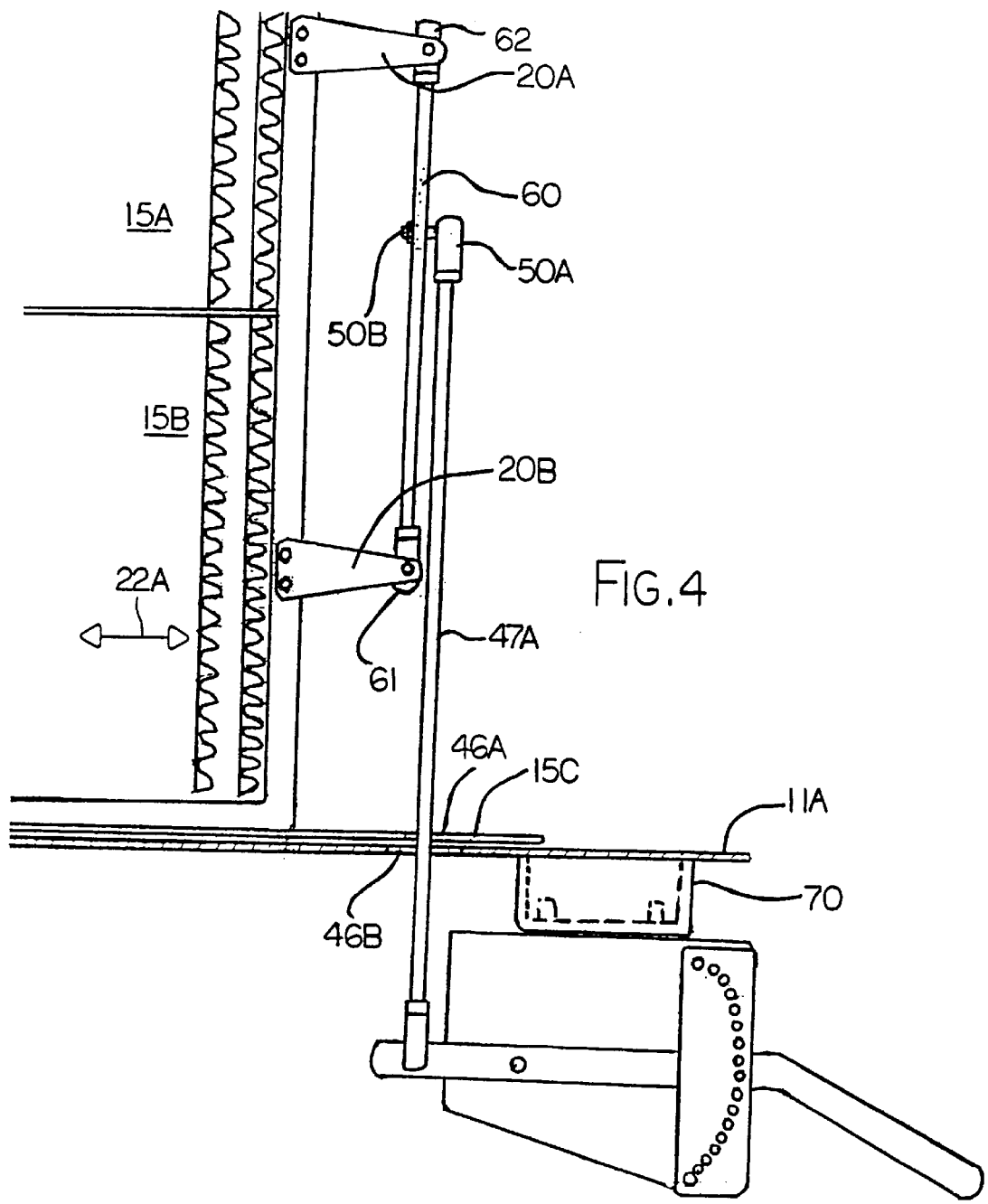
FIG. 4 is a view similar to that of FIG. 2 showing a second embodiment.
Figure 5:
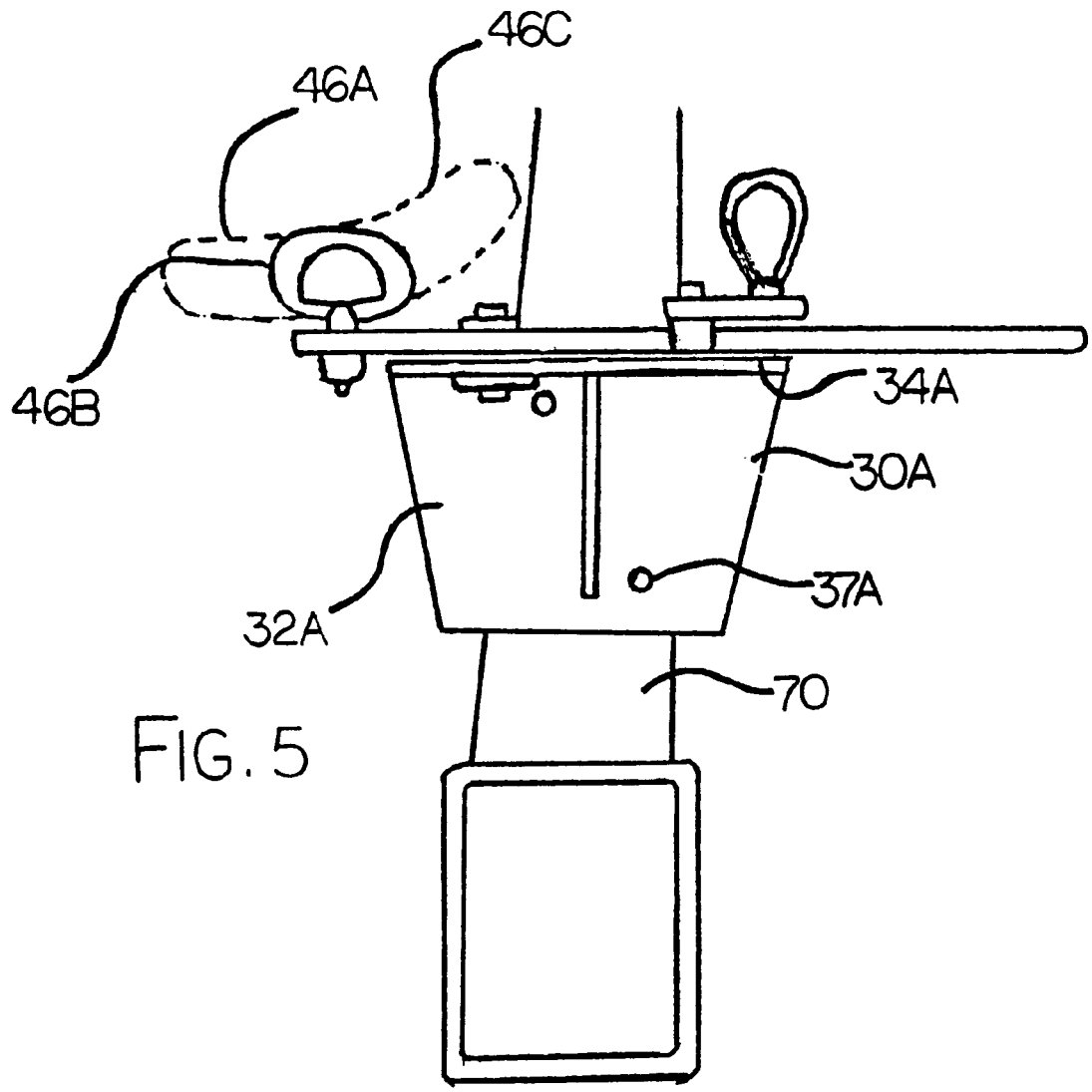
FIG. 5 is a side elevational view of the elements of FIG. 4 on the same enlarged scale.

In FIGS. 4 and 5 is shown an alternative arrangement for use with a John Deere combine harvester. In this embodiment the sieve is divided into two sections 15a and 15b each of which has a separate adjustment arm 20a and 20b. The arms are operated in this embodiment by an additional connecting rod 60 which connected across between the arms using couplings 61 and 62 so that the arms 20a and 20b can be operated simultaneously by movement of the rod 60 along its length.

In this embodiment, the rod 47A is connected by a coupling 50A to a pin 50B on the rod 60. The adjustment effected by the rod 47A is therefore actuated simultaneously through the rod 60 to both arms 20A and 20B.

Furthermore in this embodiment the bracket 30A including a vertical 32A and horizontal plate 34A is bolted to a vertical frame member 70 attached to the side wall 11A. The frame member 70 forms a channel which is welded to the side wall 11A to form the frame structure. In this embodiment, therefore, the plate 32A can be fastened more effectively to the channel 70 by screws 37A.

Furthermore in this embodiment, the sieve includes and inner frame side 15C which moves with the sieve. A slot shaped hole 46A is formed in the side wall 15C. The hole 46B formed in the side wall 11A is slightly larger than the rod 47A to accomodate the forward and rearward movement of the rod which movement is small at this position. In this embodiment further the slot 46A in the side wall 15C is of sufficient size to accomodate the movement of the sieve relative to the nearly stationary rod 47A. Also the slot 46A includes an upwardly turned rear portion 46C to accommodate a slight upward movement in the recoprocation of the sieve at the rear end of its movement.

Figure 3:
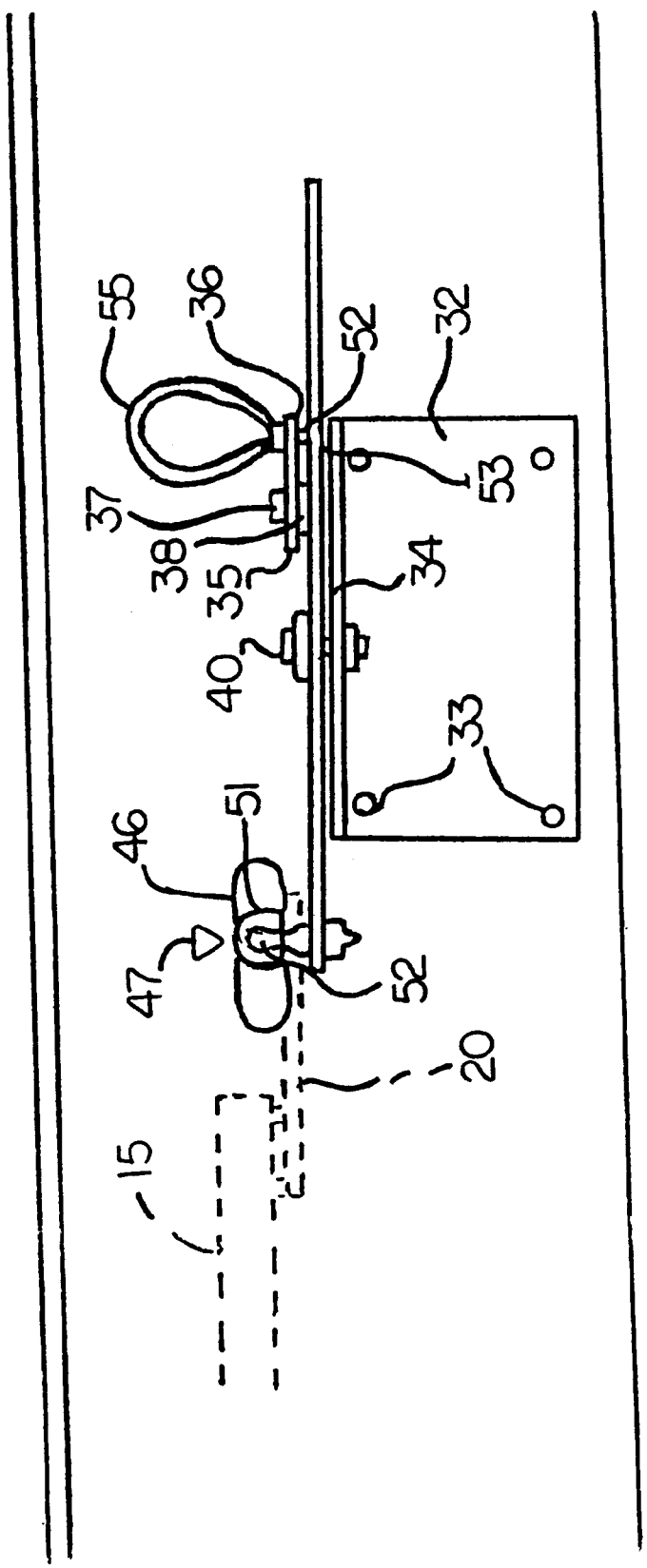
FIG. 3 is a side elevational view of the elements of FIG. 2 on the same enlarged scale.

In a further embodiment (not shown), the same construction as shown in FIG. 2 and 3 is used but in this embodiment the plate 32 is tilted so that it extends forwardly and downwardly. This allows the plate to mounted in a suitable location on a side wall of the particular arrangement of combine harvester with a rod 47 extending horizontally from the forward end of the lever.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combine harvester comprising;
    a harvester body having two side walls parallel to a longitudinal direction of the harvester body;
    generally horizontal, apertured sieve plate mounted within the body between the side walls for reciprocating movement in a direction longitudinal of the harvester body for separating grain from chaff;
    manually operable adjustment arm mounted on the sieve plate and projecting rearwardly therefrom for adjustment of apertures of the sieve plate;
    and a remote adjustment apparatus for actuating adjustment of the arm comprising;
        a bracket mounted on an outside surface of one side wall of the body, the bracket having an adjustment plate member arranged substantially at right angles to the side wall;
        an adjustment lever mounted on the adjustment plate member parallel to the plate member for pivotal movement relative thereto in a plane parallel thereto about a pivot pin at right angles to the plate member;
        an adjustment rod having one end pivotally connected to one end of the lever and an opposed end pivotally connected to the arm;
        a slot-shaped opening in the side wall adjacent the bracket;
        the rod passing through the slot shaped opening from the lever to the arm such that the rod accommodates said reciprocating movement of the sieve and the arm while the lever remains stationary and such that said pivotal movement of the lever causes pivotal movement of the arm;
        and a plurality of locating apertures on the plate member and arranged such that the lever can be locked at a selected one of a plurality of spaced positions angularly of the pivot pin relative to the plate member to locate the arm of the sieve in a predetermined adjustment position.

2. The combine harvester according to claim 1 wherein the plate member is horizontal.

3. The combine harvester according to claim 1 wherein the lever has a handle portion at an end thereof opposite the rod.

4. The combine harvester according to claim 3 wherein the handle portion is cranked relative to a main body of the lever in a direction away from the side wall.

5. The combine harvester according to claim 1 wherein the bracket includes a vertical plate bolted to the side wall.

6. The combine harvester according to claim 1 wherein the plate member includes a top strap member parallel to the plate member and defining therewith a slot so that the plate member guides the lever from one side and the strap member guides the lever from the opposed side, the locating apertures being provided in the strap member and/or the plate member.

7. The combine harvester according to claim 6 wherein the apertures are in the strap member.

8. The combine harvester according to claim 1 wherein the bracket is mounted directly on the side wall.

9. The combine harvester according to claim 1 wherein the bracket is mounted on a vertical beam forming a frame for the side wall.

10. The combine harvester according to claim 1 wherein the sieve includes a second arm parallel to the first arm and wherein there is provided an additional rod member interconnecting the arms and wherein the opposed end of the adjustment rod is attached to the additional rod member.

11. The combine harvester according to claim 1 wherein the locating apertures are arranged in an arc around the pivot pin and wherein the rod is connected to the lever at a distance from the pivot pin substantially equal to the distance of the locating apertures from the pivot pin.

12. A combine harvester comprising;
    a harvester body having two side walls parallel to a longitudinal direction of the harvester body;
    generally horizontal, apertured sieve plate mounted within the body between the side walls for reciprocating movement in a direction longitudinal of the harvester body for separating grain from chaff;
    two manually operable adjustment arms mounted on the sieve plate and projecting rearwardly therefrom for adjustment of apertures of the sieve plate;
    and a remote adjustment apparatus for actuating adjustment of the arms comprising;
        a bracket mounted on an outside surface of one side wall of the body, the bracket having an adjustment plate member arranged substantially at right angles to the side wall;
        an adjustment lever mounted on the adjustment plate member parallel to the plate member for pivotal movement relative thereto in a plane parallel thereto about a pivot pin at right angles to the plate member;

an adjustment rod having one end pivotally connected to one end of the lever and an opposed end pivotally connected to the arm;

a slot-shaped opening in the side wall adjacent the bracket;

the rod passing through the slot shaped opening from the lever to the arms such that the rod accommodates said reciprocating movement of the sieve and the arms while the lever remains stationary and such that said pivotal movement of the lever causes pivotal movement of the arms;

an additional rod member interconnecting the arms with the opposed end of the adjustment rod attached to the additional rod member and a plurality of locating apertures on the plate member and arranged such that the lever can be locked at a selected one of a plurality of spaced positions angularly of the pivot pin relative to the plate member to locate the arm of the sieve in a predetermined adjustment position.

13. The combine harvester according to claim 12 wherein the plate member is horizontal.

14. The combine harvester according to claim 12 wherein the lever has a handle portion at an end thereof opposite the rod.

15. The combine harvester according to claim 12 wherein the handle portion is cranked relative to a main body of the lever in a direction away from the side wall.

16. The combine harvester according to claim 1 wherein the bracket includes a vertical plate bolted to a vertical beam forming a frame for the side wall.

17. The combine harvester according to claim 12 wherein the plate member includes a top strap member parallel to the plate member and defining therewith a slot so that the plate member guides the lever from one side and the strap member guides the lever from the opposed side, the locating apertures being provided in the strap member and/or the plate member.

18. The combine harvester according to claim 12 wherein the locating apertures are arranged in an arc around the pivot pin and wherein the rod is connected to the lever at a distance from the pivot pin greater than the distance of the locating apertures from the pivot pin.

* * * * *